United States Patent  (10) Patent No.: US 11,554,656 B2
Aulin  (45) Date of Patent: Jan. 17, 2023

(54) POWER SPLIT ALL-WHEEL DRIVE SYSTEM

(71) Applicant: BorgWarner Sweden AB, Landskrona (SE)

(72) Inventor: Hans Aulin, Lomma (SE)

(73) Assignee: BorgWarner Sweden AB, Landskrona (SE)

( * ) Notice: Subject to any disclaimer, the term of this patent is extended or adjusted under 35 U.S.C. 154(b) by 0 days.

(21) Appl. No.: 17/482,768

(22) Filed: Sep. 23, 2021

(65) Prior Publication Data

US 2022/0153117 A1    May 19, 2022

(51) Int. Cl.
*B60K 17/346* (2006.01)
*B60K 6/445* (2007.10)

(52) U.S. Cl.
CPC .......... *B60K 6/445* (2013.01); *B60K 17/3467* (2013.01)

(58) Field of Classification Search
CPC ............... B60K 6/445; B60K 17/3467; B60K 2006/4808; B60K 6/52
See application file for complete search history.

(56) References Cited

U.S. PATENT DOCUMENTS

| | | | |
|---|---|---|---|
| 6,533,692 B1 * | 3/2003 | Bowen | B60K 23/08 903/952 |
| 10,030,755 B2 | 7/2018 | Severinsson et al. | |
| 2002/0107101 A1 * | 8/2002 | Bowen | B60K 6/52 903/910 |
| 2015/0291026 A1 | 10/2015 | Meixner | |
| 2019/0061521 A1 * | 2/2019 | Guo | B60K 6/40 |

FOREIGN PATENT DOCUMENTS

DE     102017218858 A1    10/2018

OTHER PUBLICATIONS

Sweden Patent Office Search Report for application No. 2051341-2.
Partial European search report dated Jun. 8, 2022; Application No. 21198576.7-1012; Applicant: BorgWarner Sweden AB; 13 pages.
Extended European search report dated Oct. 13, 2022; Application No./Patent No. 21198576.7/4035920 Applicant: BorgWarner Sweden AB; 12 pages.

* cited by examiner

*Primary Examiner* — Justin Holmes
(74) *Attorney, Agent, or Firm* — Brooks Group, PLC

(57) ABSTRACT

The present disclosure refers to an all-wheel drive system (10) for a vehicle (12), including: an electrical motor (24) being connected to a first axle (26) of a planetary gear set (28) arranged at an output side (30) of a vehicle gearbox (32), and a second axle (34) of the planetary gear set (28) being connected or connectable to the gearbox output shaft (36) or to ground (G) by a coupling (I).

9 Claims, 5 Drawing Sheets

POWER SPLIT ALL-WHEEL DRIVE SYSTEM

TECHNICAL FIELD

The present invention relates to an all-wheel drive (AWD) system for a vehicle.

BACKGROUND

Existing solutions to provide all-wheel drive in a vehicle have been on the market for many years. In the state of the art, for example, so called P3-drive-systems are well known. This type of drive system commonly refers to a drive system for a vehicle, comprising a first motor, such as a combustion motor and a second motor, such as an electrical motor. In P3-systems, the electrical motor is connected to an output shaft of a gearbox of the associated vehicle.

However, as the technology develops there is a need of further improvement, especially with regard to fuel consumption and driving characteristics.

For example, the patent document US 20190061521 A1 discloses a transfer case of an all-wheel drive system for a vehicle. The system comprises an electric motor being connected to a first axle in the form of a sun gear's axle of a planetary gear set. The planetary gear set is arranged at an output side formed by an output shaft of a transmission. Further, there is a coupling and a second axle of the planetary gear set formed by a ring gear's axle of the planetary gear set. Said ring gear's axle is permanently connected to the output shaft and the coupling is selectively locking the rotation of the ring gear to a housing of the transfer case or unlocking the rotation of the ring gear. Moreover, there is a third axle in the form of a planet gear's axle of the planetary gear set. Said third axle is connected to a rear axle of the respective vehicle.

The patent document WO 2017178595 A2 discloses another all-wheel drive system for a vehicle that comprises a differential. There is a first planetary gear set comprising a planetary gear set output, which is connected to a housing of the differential. The housing forms a differential output. Further, there is a second planetary gear set with a planetary gear set output, which is connected to a right output shaft of the differential, forming another differential output. The first and second planetary gear sets are sharing a common ring wheel. The differential is arranged on-axis of a respective front or rear axle of said vehicle.

Finally, the patent document US 20060079369 A1 shows a vehicle drive system, wherein a differential embodied by a planetary gear set is arranged between a transmission, a front axle and a rear axle of the vehicle.

SUMMARY

The present invention seeks to overcome the drawbacks of existing systems by providing an improved all-wheel drive system. One of the objectives underlying the present invention in particular is to provide an all-wheel drive system that is highly efficient and features improved driving characteristics.

These objectives are achieved by the technical subject-matter of the independent claims 1 and 4. Preferred embodiments of the present invention can be gained from the dependent claims and the present disclosure in general.

The technical solutions of the independent claims 1 and 4 are solving the above problems by addressing an overall technical task, with its technical solution being implemented in two alternative technical Concepts 1 and 2.

The overall technical task is to provide an all-wheel drive system for a vehicle that is capable of effectively controlling a wheel slip between a front and rear axle of the associated vehicle.

A first aspect of the invention refers to an all-wheel drive system for a vehicle, comprising:
an electrical motor being connected to a first axle of a planetary gear set arranged at an output side of a vehicle gearbox, and
a second axle of the planetary gear set being connected or connectable to the gearbox output shaft or to ground by a coupling,
while a third axle of the planetary gear set is connected or connectable to the front axle of the associated vehicle.

The inventive solution according to the first aspect of the invention is also referred to herein as "Concept 1".

The coupling can be embodied by a permanent connection, which means a permanent non-switchable coupling, or by a switchable coupling. Based on this inventive solution of Concept 1, a wheel slip between a front and rear axle of the associated vehicle can be controlled at a significantly decreased response time compared to a conventional all-wheel drive system using frictional clutches. This is based on the electrical motor that is permanently connected to the planetary gear set and can be controlled for the purpose of wheel slip adjustment in a very fast and accurate manner. The inventive solution of Concept 1 in particular controls the front and rear wheel slip by appropriate allocation of torque between the respective front and rear wheels, which is achieved by appropriate operation of the electrical engine. This means, controlling said wheel slip in particular refers to controlling a torque split between the front and rear axle.

The response time herein is defined as a time span from requesting a torque from the electrical motor to its impact on the front and/or rear axle.

If the second axle of the planetary gear set is permanently connected to the gearbox output shaft via a non-switchable coupling, a torque from an internal engine of the vehicle is delivered via the vehicle gearbox and split up in a pre-defined ratio among the front and rear axles. The electrical motor is then capable of operating at a level appropriate to compensate for a wheel slip that may occur during operation of the vehicle in a very fast and accurate manner. This is referred to as a longitudinal torque vectoring all-wheel drive mode of Concept 1 herein. Generally, when referring to a motor or engine herein, this term is not limited to either an electrical, combustion or other type of engine or motor. Both terms are used as synonyms herein, unless the present disclosure states anything more specific.

If the second axle of the planetary gear set is permanently connected to ground via a non-switchable coupling, the rear axle is driven by the internal engine of the vehicle and the front axle is driven by the electrical engine. Connected to ground generally refers to being connected to a static structure of the system. Again, the electrical motor is capable of adapting the front wheel drive with respect to any wheel slip occurring between the front and rear axle. This is referred to as a hybrid all-wheel drive mode of Concept 1 herein.

If the second axle of the planetary gear set is selectively connectable either to the gearbox output shaft or to ground via a switchable coupling, it can be switched between the above described modes.

Based on that, at least two drive modes can be realized with a switchable coupling. There can be more switchable couplings comprised by the all-wheel drive system of the inventive Concept 1 in order to enable for additional drive modes that will be described in further detail later on. For example, a second coupling can be provided selectively connecting the internal engine of the vehicle to the vehicle gearbox and a third coupling can be provided selectively connecting the third axle of the planetary gear set to the front axle of the vehicle.

While allowing for a variety of different drive modes, the response time is kept at a very low level and a high torque accuracy is achieved. At the same time, the technical system complexity remains at a low level. As a secondary effect, the fuel consumption of the vehicle is also decreased. With regard to energy efficiency, in the inventive Concept 1 the kinetic energy of the rotating drive shafts may be used to charge a battery via the permanently connected electrical motor, for example. This implies operational states, wherein the system counteracts wheel slip, which means the electrical motor may be acting as a generator. The inventive Concept 1 in particular works without any need of friction clutches, since the rotational speed of rotating axles, that are to be coupled to each other, can be synchronized prior to coupling by appropriate control of the electrical motor in a fast and accurate manner.

In a preferred embodiment of the all-wheel drive system of the inventive Concept 1, the coupling is switchable and in a disconnected state, the coupling is disconnected from the gearbox output shaft and connecting the second axle of the planetary gear set to ground.

This embodiment allows for fast and easy switching of drive modes by synchronization of the drive shafts by appropriate control of the electrical motor followed by connecting or disconnecting the coupling.

In a preferred embodiment of the all-wheel drive system of the inventive Concept 1, the first, second, and third axles of the planetary gear set are comprised by either one of a sun gear wheel, a planet carrier or a ring gear wheel. Said first, second, and third axles of the planetary gear set can be comprised by said components of the planetary gear set in any configuration, which merely as an example means said first axle can be comprised by said sun gear wheel, said second axle can be comprise by said planet carrier and said third axle can be comprised by said ring gear wheel. The first, second, and third axles of the planetary gear set can also embody either of said components of the planetary gear set.

Based on that, the system design of the inventive Concept 1 is very flexible.

A second aspect of the present invention refers to an all-wheel drive system for a vehicle, comprising:
 a differential arranged between a vehicle gearbox and a front and rear axle of an associated vehicle,
 a first planetary gear set having a planetary gear set output being connected to one of the differential outputs, and
 a second planetary gear set having a planetary gear set output being connected to the other one of the differential outputs, wherein
said first and second planetary gear set are sharing a common ring wheel, and an electrical motor is selectively connectable to one of the planetary gear sets or to a gearbox output shaft by means of a coupling.

The alternative inventive solution according to the second aspect of the invention is also referred to herein as "Concept 2".

The coupling in the inventive Concept 2 is embodied by a switchable coupling. Based on this inventive solution of Concept 2, a wheel slip, or torque split respectively, between a front and rear axle of the associated vehicle can be controlled at a significantly decreased response time compared to a conventional all-wheel drive system using frictional clutches. This is based on the electrical motor that is either connected to the respective planetary gear set or can be connected very quickly to it and allows for controlling of any torque split between the front and rear axles in a very fast and accurate manner.

If the electrical motor is connected to one of the planetary gear sets, a torque from an internal engine of the vehicle is delivered via the vehicle gearbox and distributed in a pre-defined ratio among the front and rear axles via the differential. The electrical motor is then capable of operating at a level appropriate to compensate for any wheel slip that may occur during operation of the vehicle in a very fast and accurate manner. This is referred to as a longitudinal torque vectoring all-wheel drive mode of Concept 2 herein.

If the electrical motor is connected to the gearbox output shaft, the combined torque delivered by the internal engine and the electrical motor is distributed in a pre-defined ratio among the front and rear axles via the differential. This is referred to as a hybrid all-wheel drive mode of Concept 2 herein.

Based on that, two drive modes can be realized with the switchable coupling. There can be more switchable couplings comprised by the all-wheel drive system of the inventive Concept 2 in order to enable for additional drive modes that will be described in further detail later on. For example, a second coupling can be provided selectively connecting the internal engine of the vehicle to the vehicle gearbox and a third coupling can be provided selectively connecting the front or rear axle to one of the planetary gear sets.

While allowing for a variety of different drive modes, the response time is kept at a very low level and a high torque accuracy is achieved. At the same time, the technical system complexity remains at a low level. As a secondary effect, the fuel consumption of the vehicle is also decreased. With regard to energy efficiency, in the inventive Concept 2 the kinetic energy of the rotating drive shafts may be used to charge a battery via the electrical motor if it is connected, for example. The inventive Concept 2 in particular works without any need of friction clutches, since the rotational speed of rotating axles, that are to be coupled to each other, can be synchronized prior to coupling by appropriate control of the electrical motor in a fast and accurate manner.

In a preferred embodiment of the all-wheel drive system of the inventive Concept 2, in a disconnected state, the coupling is connecting the electrical motor to the gearbox output shaft.

In a preferred embodiment of the all-wheel drive system of any of the inventive Concepts 1 or 2, said coupling is a non-friction clutch.

The possibility of using a non-friction clutch is particularly related to the use of the electrical motor that allows for fast and safe synchronization of the respective rotating axles that are to be coupled.

This also decreases the system costs and the packaging size and improves the thermal behaviour of the system, due to decreased friction effects. The overall efficiency of the system is therefore further improved.

In a further preferred embodiment of the all-wheel drive system of any of the inventive Concepts 1 or 2, the non-friction clutch is a dog clutch or a coupling sleeve.

These types of non-friction clutches are robust, of low complexity, durable and can be actuated at a high speed. Further, these types of clutches realize an immediate torsionally rigid connection.

A third aspect of the invention refers to a vehicle, comprising an all-wheel drive system according to any embodiment of the inventive Concepts 1 or 2.

BRIEF DESCRIPTION OF THE DRAWINGS

In the following, reference will be made to the appended Figures, in which.

Further, reference will be made to the appended Additional Illustrations, in which Additional Illustrations 1-18 are showing further technical subject-matter that forms part of the present disclosure.

DETAILED DESCRIPTION

Figure 1:
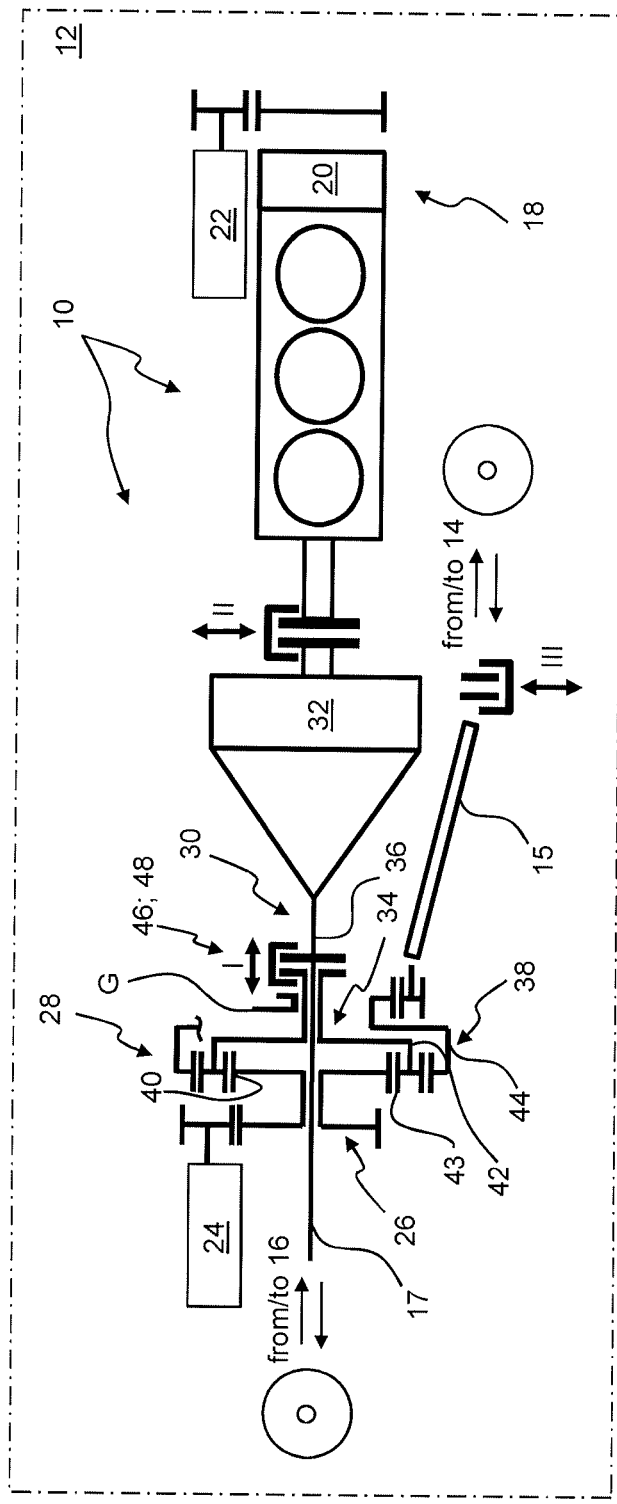
FIG. 1 is a schematic view of an all-wheel drive system for a vehicle according to an embodiment of the inventive Concept 1.

A schematic view of an all-wheel drive system 10 for a vehicle 12 according to the inventive Concept 1 is shown in FIG. 1. The vehicle 12 is generally indicated by its system boundaries in the present disclosure, with reference to some of the relevant components in more detail. The vehicle 12 has a front axle 14 and a rear axle 16. The front axle 14 and rear axle 16 of the vehicle normally comprise axle differentials for torque distribution between left and right wheels of the respective axle, which are however not essential to operate the invention disclosed herein. The front axle 14 and rear axle 16 are connected or connectable to the all-wheel drive system 10 via a front drive shaft 15 and a rear drive shaft 17, respectively. This connection may be realized via the respective differentials (if present) and may imply a gear ratio between the respective differentials and drive shafts 15, 17.

Further, the vehicle comprises an internal engine 18. The internal engine 18 may comprise an internal combustion engine 20, an internal electrical engine 22 or a combination thereof.

The all-wheel drive system 10 of the inventive Concept 1 essentially comprises an electrical motor 24 being connected to a first axle 26 of a planetary gear set 28. The planetary gear set 28 is arranged at an output side 30 of a gearbox 32 of the associated vehicle 12. There is a coupling I permanently or selectively connecting a second axle 34 of the planetary gear set 28 to a gearbox output shaft 36 or to ground G, while a third axle 38 of the planetary gear set 28 is connected or connectable to the front axle 14 of the associated vehicle 12.

Optionally, the first 26, second 34, and third axle 38 of the planetary gear set 28 may be comprised by either one of a sun gear wheel 40, a planet carrier 42 or a ring gear wheel 44. In the embodiment shown in FIG. 1, merely as one of these options, the first axle 26 is comprised by the sun gear wheel 40, the second axle 34 is comprised by the planet carrier 42 and the third axle 38 is comprised by the ring gear wheel 44.

If the second axle 34 of the planetary gear set 28 is permanently connected to the gearbox output shaft 36 via a non-switchable coupling I, a torque from the internal engine 18 of the vehicle 12 is delivered via the vehicle gearbox 32 and split up in a pre-defined ratio among the front 14 and rear axles 16. The electrical motor 24 is then capable of operating at a level appropriate to compensate for any wheel slip that may occur between the front 14 and rear axles 16 during operation of the vehicle 12 in a very fast and accurate manner. This operating level may be around zero rotations per minute and is proportional to the wheel slip to be compensated for. This mode is referred to as a longitudinal torque vectoring all-wheel drive (AWD) mode of Concept 1 herein.

If the second axle 34 of the planetary gear set 28 is permanently connected to ground G via a non-switchable coupling I, the rear axle 16 is driven by the internal engine 18 of the vehicle 12 and the front axle 14 is driven by the electrical motor 24. Again, the electrical motor 24 is capable of adapting the front wheel drive (FWD) with respect to any wheel slip occurring between the wheels of the front 14 and rear axle 16. This mode is referred to as a hybrid all-wheel drive (AWD) mode of Concept 1 herein.

In the preferred embodiment shown in FIG. 1, the coupling I is a switchable coupling 46, preferably but optionally a non-friction clutch. In particular preferred but optional, said switchable non-friction clutch 46 is a dog clutch 48. In the illustrated embodiment, in a disconnected state, said coupling is connecting the second axle 34 of the planetary gear set 28 to ground G.

The all-wheel drive system 10 as in the preferred embodiment shown in FIG. 1 further comprises a second switchable coupling II and a third switchable coupling III.

Based on that, the all-wheel drive system 10 shown in FIG. 1 allows for configuration of a variety of different drive modes by configuring different combinations of opening or closing the couplings I, II and III. All realizable drive modes can be derived by a skilled person from the shown system set-up, depending on the opening or closing state of each coupling I, II, III and the operational state of the respective engines 18, 24. In the following, five of these modes are described in further detail:

In a first drive mode, also referred to as an electric vehicle drive mode of Concept 1, the coupling I is connected to ground G, the second coupling II is open and the third coupling III is closed. As the second coupling II is open, the internal engine 18 of the vehicle 12 is not providing any torque to any of the front 14 or rear axles 16. As the coupling I is connected to ground G, the second axle 34, which is the planet carrier 42 in this example, of the planetary gear set 28 stands still. Thus, a torque delivered by the electrical motor 24 is transmitted via the first axle 26, which is the sun gear wheel 40 in this example, via a planet gear wheel 43 of the planetary gear set 28 to the third axle 38, which is the ring gear wheel 44 in this example. The torque is then further transmitted via the front drive shaft 15 and the closed third coupling III to the front axle 14. Thus, the first drive mode is an electric front wheel drive mode (FWD). The drive voltage applied to the electrical motor 24 may be 48 V, for example, but could be any other suitable drive voltage.

In a second drive mode, also referred to as a hybrid drive mode of Concept 1, which preferably is an all-wheel drive mode (AWD), the coupling I is connected to ground G, the second coupling II is closed and the third coupling III is closed. As the coupling I is connected to ground G, the planet carrier 42 is standing still. As the second coupling II is also closed, the internal engine 18 of the vehicle 12 is providing a torque to the rear axle 16 via the gearbox output shaft 36 and the rear drive shaft 17. At the same time, as the third coupling III is also closed, the torque from the electrical motor 24 is transmitted to the front axle 14 in the above stated manner. Thus, the second drive mode is an internal engine 18 rear wheel drive mode (RWD) and electric front wheel drive mode (FWD). For example, this can be a low speed all-wheel drive mode (AWD).

In a third drive mode, also referred to as a longitudinal torque vectoring drive mode (TVD) of Concept 1, which preferably is an all-wheel drive mode (AWD), the coupling I is connected to the gearbox output shaft 36, the second coupling II is closed and the third coupling III is closed. As the second coupling II is closed, the internal engine 18 of the vehicle 12 is providing a torque to the rear axle 16 via the gearbox output shaft 36 and the rear drive shaft 17 and at the same time to the planet carrier 42, which passes on the torque to the front axle 14 via the ring gear wheel 44 and the third coupling III. The torque controlled to be supplied by the electrical motor 24 is proportional to the desired transfer of torque between the rear axle 16 and the front axle 14. As long as no wheel slip occurs, the torque is controlled to be at a pre-defined level, which leads to a split of the torque supplied by the internal engine 18 among the rear drive shaft 17 and the front drive shaft 15 in a pre-defined ratio, according to the desired dynamic vehicle 12 properties for different driving situations. If a wheel slip occurs, the electrical motor 24 is controlled to operate at a rotational speed and torque proportional to the wheel slip between the rear axle 16 and the front axle 14.

In a fourth drive mode, also referred to as a low drag mode, sailing mode or disconnected mode of Concept 1, the coupling I is connected to ground G and the second coupling II and third coupling III are open. This means, the planetary gear set 28 is standing still and none of the front 14 or rear axles 16 are connected to any torque source of the vehicle 12. Thus, the vehicle 12 is rolling freely, depending on its current kinetic energy.

In a fifth drive mode, also referred to as an internal engine 18 drive mode of Concept 1, the coupling I is connected to ground G, the second coupling II is closed and the third coupling III is open. In this mode, the front axle 14 is disconnected from the drive system and the rear axle 16 is driven by the internal engine 18. Accordingly, this is a rear wheel drive mode (RWD).

Figure 2:
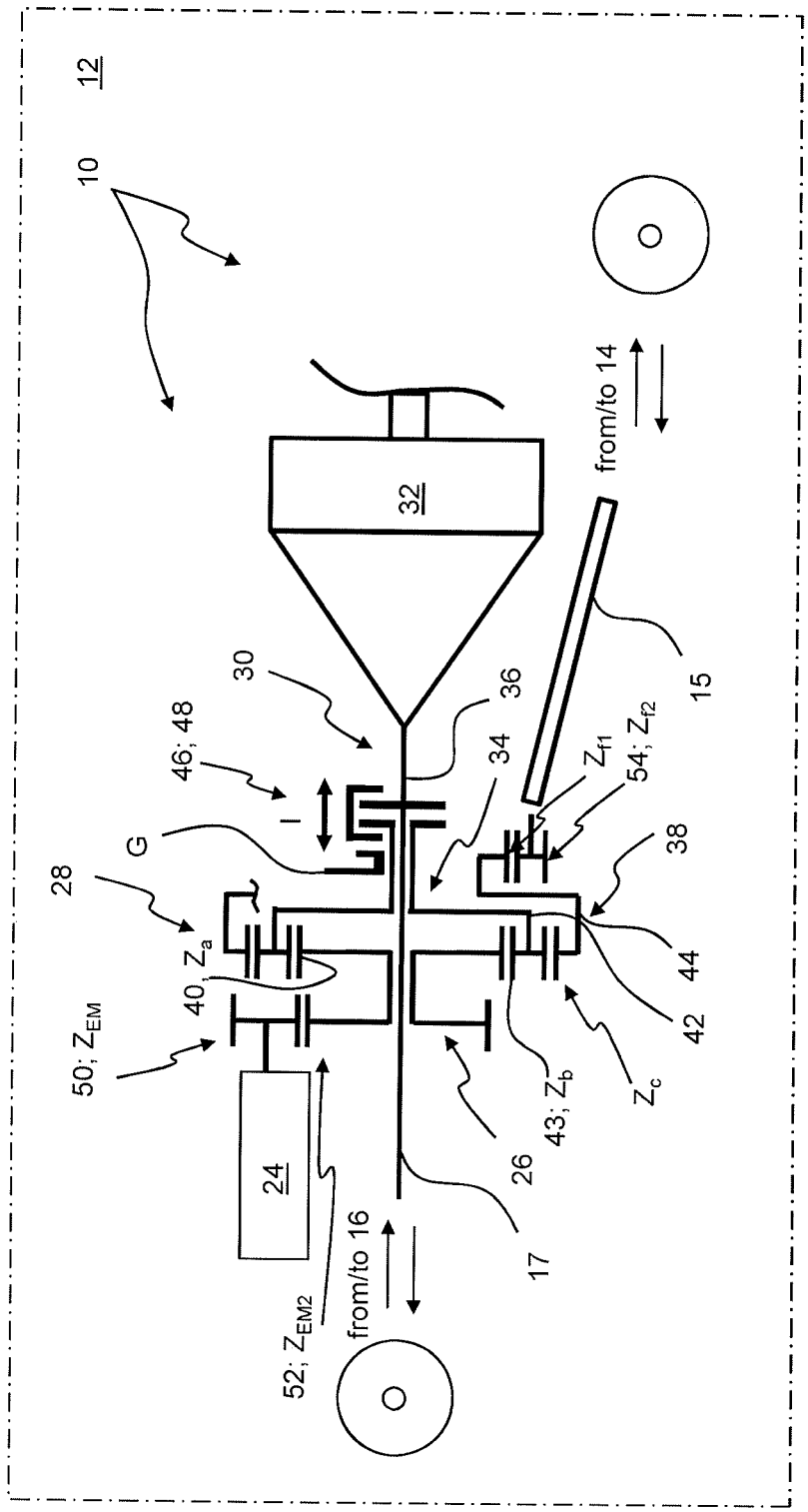
FIG. 2 is a schematic view of an all-wheel drive system for a vehicle according to another embodiment of the inventive Concept 1 related to FIG. 1.

FIG. 2 shows a simplified illustration of the embodiment shown in FIG. 1, only with coupling I. However, the same embodiment is compatible with all features as described with reference to FIG. 1. The electrical motor 24 is connected to the planetary gear set 28 via an electrical motor gear wheel 50 comprising a number of teeth $Z_{EM}$. The electrical motor gear wheel 50 is engaged with a second electrical motor gear wheel 52 comprising a number of teeth $Z_{EM2}$. The second electrical motor gear wheel 52 is connected to the sun gear wheel 40 comprising a number of teeth $Z_a$. The sun gear wheel 40 is engaged with the planet gear wheels 43 comprising a number of teeth $Z_b$. The planet gear wheel 43 is engaged with the ring gear wheel 44 comprising a number of teeth $Z_c$. Directed to the front axle 14, the ring gear wheel 44 has a number of teeth $Z_{f1}$ and is engaged with a gear wheel 54 having a number of teeth $Z_{f2}$ and being functionally connected to the front drive shaft 15.

Preferably, the number of teeth may have the following configurations:
$Z_{EM}=25$;
$Z_{EM2}=50$ or 94;
$Z_a=43$;
$Z_b=43$;
$Z_c=129$;
$Z_{f1}=43$; and
$Z_{f2}=57$.

Based on that, the following gear ratios may apply:
electrical motor 24 to rear drive shaft $17=Z_{EM2}/Z_{EM}*(Z_c/Z_a+1)=94/25*(129/43+1)=+15$;
electrical motor 24 to front drive shaft $15=Z_{EM2}/Z_{EM}*(Z_c/Z_a)*(Z_{f2}/Z_{f1})=94/25*(-129/43)*(-57/43)=15$; and
internal engine 18 (not shown) to rear drive shaft 17=1.

The above ratios are for example relevant for the longitudinal torque vectoring drive (TVD) mode, the third drive mode of Concept 1 respectively, wherein torque vectoring between the front 14 and rear axles 16 is done via the electrical motor 24.

Further, the following gear ratios may apply:
electrical motor 24 to rear drive shaft 17=disconnected; and
electrical motor 24 to front drive shaft $15=Z_{EM2}/Z_{EM}*(Z_c/Z_a)*(Z_{f2}/Z_{f1})=94/25*(-129/43)*(-57/43)=15$.

The above ratios are for example relevant for the hybrid drive mode of Concept 1, the second drive mode respectively, wherein coupling I is connected to ground G.

Also the following gear ratios may apply, for example to the longitudinal torque vectoring drive (TVD) mode of Concept 1:
electrical motor 24 to rear drive shaft $17=Z_{EM2}/Z_{EM}*(Z_c/Z_a+1)=50/25*(129/43+1)=8$; and
electrical motor 24 to front drive shaft $15=Z_{EM2}/Z_{EM}*(Z_c/Z_a)*(Z_{f2}/Z_{f1})=50/25*(-129/43)*(57/43)=-8$.

Also the following gear ratios may apply, for example to the hybrid drive mode of Concept 1:
electrical motor 24 to rear drive shaft 17=disconnected, and
electrical motor 24 to front drive shaft $15=Z_{EM2}/Z_{EM}*(Z_c/Z_a)*(Z_{f2}/Z_{f1})=50/25*(-129/43)*(-57/43)=8$.

Figure 3:
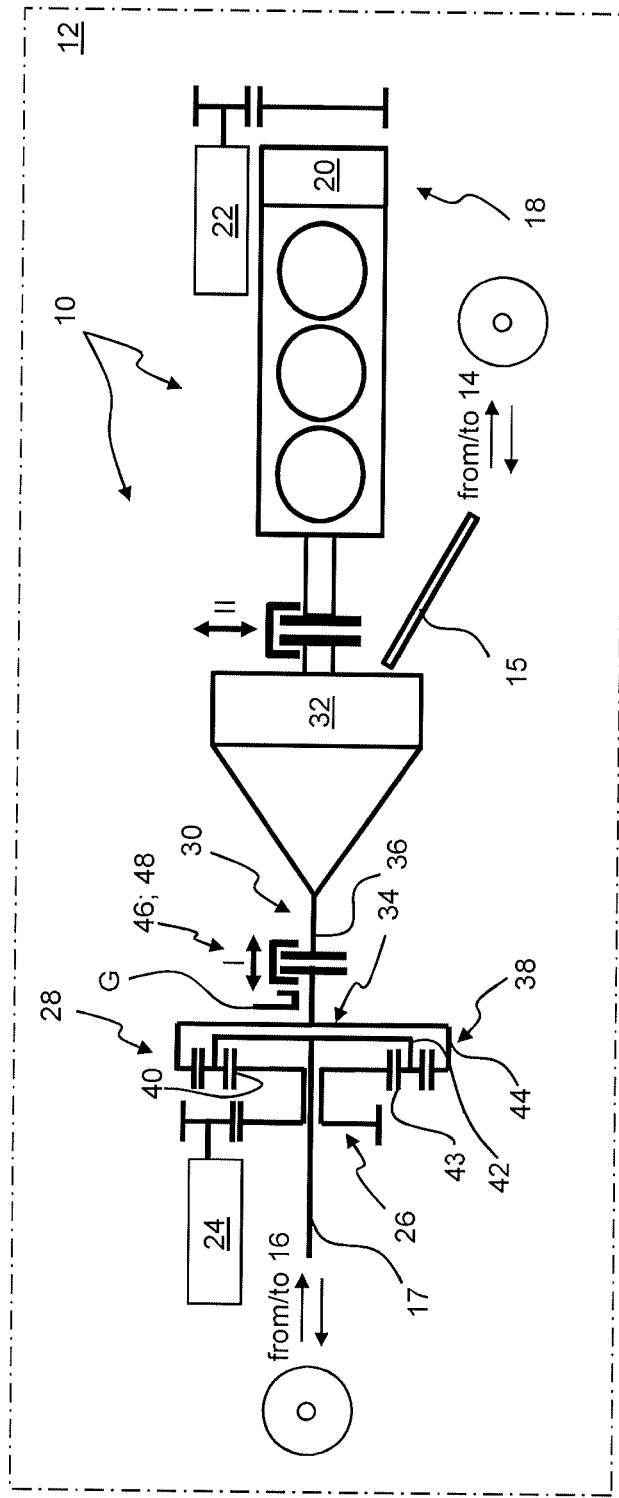
FIG. 3 is a schematic view of an all-wheel drive system for a vehicle according to another embodiment of the inventive Concept 1 related to FIGS. 1 and 2.

In FIG. 3, there is a schematic view of an all-wheel drive system 10 for a vehicle 12 according to another embodiment of the inventive Concept 1, which is similar to the embodiments shown in FIGS. 1 and 2. Therefore, only the differences will be described.

As can be seen in FIG. 3, the front drive shaft 15 is indirectly connected to the planetary gear set 28 via the gearbox 32. Based on that, a front wheel drive (FWD) mode without the electrical motor 24 can be configured by closing coupling II, whereas the state of coupling I can be either connected to ground G or to the gearbox output shaft 36. Further, a hybrid all-wheel drive mode can be configured by closing coupling II and connecting coupling I to ground G. Further, an electric rear wheel drive (RWD) mode can be configured by opening coupling II and putting coupling I to ground G. To achieve a longitudinal torque vectoring (TVD) mode, coupling II needs to be closed and coupling I needs to be connected to the gearbox output shaft 36.

Figure 4:
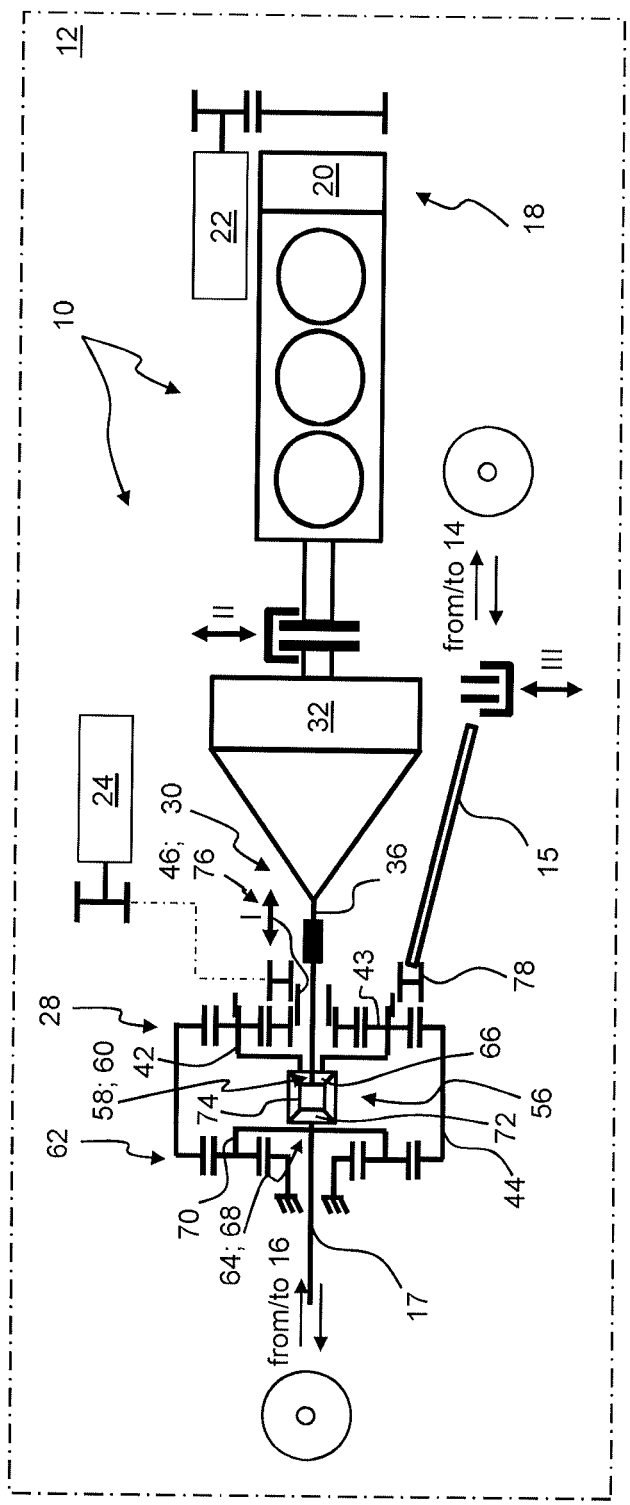
FIGS. 4 and 5 are schematic views of an all-wheel drive system according to an embodiment of the inventive Concept 2.
Figure 5:
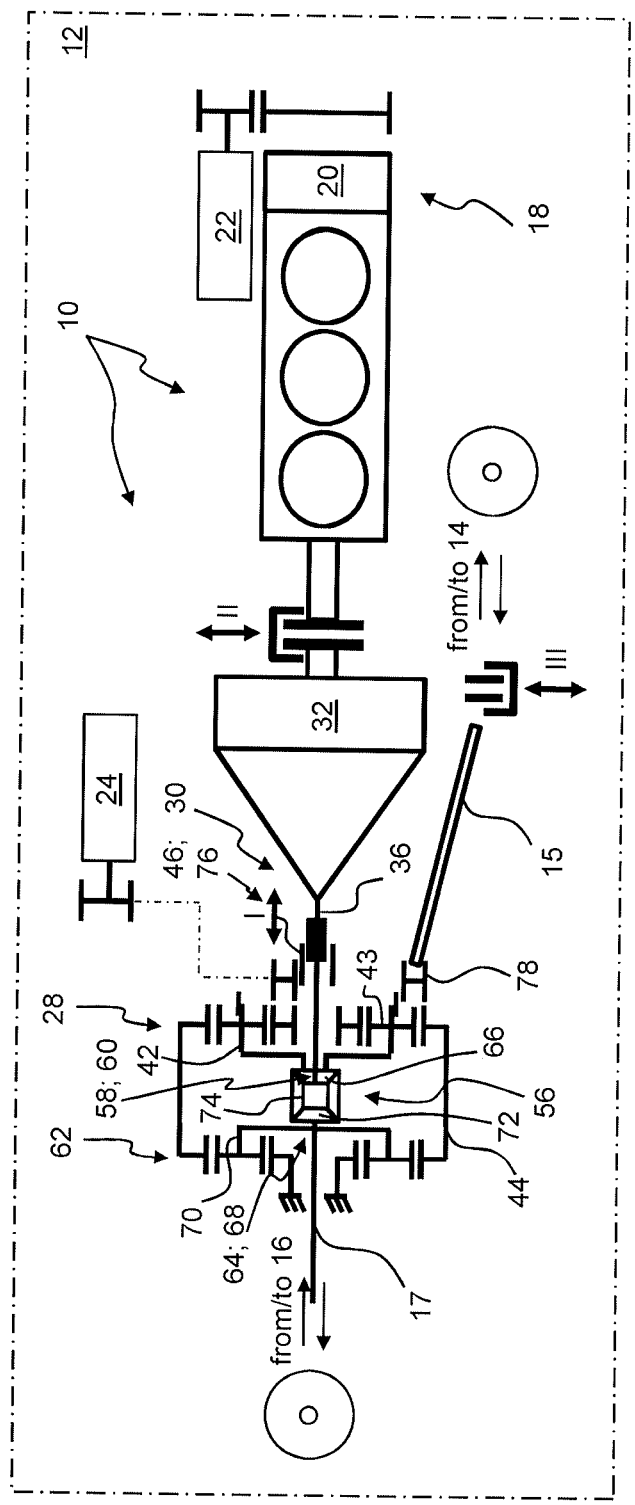

FIGS. 4 and 5 are schematically showing an all-wheel drive system 10 for a vehicle 12 according to an embodiment of the inventive Concept 2 and are referred to commonly, if not stated otherwise.

The Figures show the all-wheel drive system 10, that essentially comprises a differential 56 arranged between a vehicle gearbox 32 and a front 14 and rear axle 16 of the associated vehicle 12. Further, there is a first planetary gear set 28 having a planetary gear set output 58 being connected to one of the differential outputs 60. Further there is a second planetary gear set 62 having a planetary gear set output 64 being connected to the other one of the differential outputs 68. The first 28 and second planetary gear set 62 are sharing a common ring wheel 44, and an electrical motor 24 is selectively connectable to one of the planetary gear sets 28 or to a gearbox output shaft 36 by means of a coupling I.

The focus of the description of Concept 2 will be put on the differences to Concept 1 and in particular to the part of the system 10 starting from the gearbox output shaft 36 in the direction of its front 14 and rear axles 16. Apart from that, if not different statement is made herein, reference can be fully made to the foregoing description.

The system 10 of FIGS. 4 and 5 also comprises an internal engine 18. Just as an example, the planetary gear set output 58, being connected to the one of the differential outputs 60, is a planet carrier 42 in this example and the differential output 60 is a bevel gear 66 in this example. Further, merely as an example, the planetary gear set output 64, connected to the other differential output 68, also is a planet carrier 70 in this example and the other differential output 68 is a bevel gear 72, too. Exemplarily, the gearbox output shaft 36 is connected to a cage 74 of the differential 56.

Illustrated couplings II and III in this Concept 2 are optional if not stated otherwise, but are preferred and therefore illustrated in FIGS. 4 and 5. The front axle 14 is functionally connected or connectable to the planetary gear set 28, in this example via a connecting gear 78 that is exemplarily engaged with a planet gear wheel 43 of the planetary gear set 28.

The coupling I in the inventive Concept 2 is a switchable coupling 46. Preferably, the coupling I is a switchable non-friction clutch 46. Particularly preferred and illustrated in FIGS. 4 and 5 the coupling 46 is embodied by a coupling sleeve 76.

As can be seen in FIGS. 4 and 5, the coupling sleeve 76 is switchable between a connected state, wherein it connects the electrical motor 24 to the planetary gear set 28 and a disconnected state, wherein the coupling I is connecting the electrical motor 24 to the gearbox output shaft 36. It will be understood by a person skilled in the art, that in case of the non-friction clutch 46, for example the coupling sleeve 76, said non-friction clutch 46 can be switched to a neutral state (not shown), as well, wherein said non-friction clutch 46 is disconnecting the electrical motor 24 from the planetary gear set 28 and from the gearbox output shaft 36, in order to adapt the rotational speed of the electrical motor 24 to that of the respective component, the electrical motor 24 is to be coupled to. Also in case of a friction clutch, this neutral state is advantageous for the above reasons.

Based on this, for example three drive modes can be configured:

In a first drive mode shown in FIG. 4, which may be referred to as a longitudinal torque vectoring (TVD) mode of Concept 2, the coupling I connects the electrical motor 24 to the planetary gear set 28 and coupling II is closed. Thus, a torque delivered by the internal engine 18 is distributed in a pre-defined ratio, for example equally, to the front 14 and rear axle 16 via the cage 74 to achieve an all-wheel drive (AWD). If the electrical motor 24 is operated, preferably proportionally to a wheel slip between the front 14 and rear axle 16, additional torque is delivered to the front axle 14 via the planet carrier 42.

In a second drive mode shown in FIG. 5, which may be referred to as an electric vehicle drive mode of Concept 2, the coupling I connects the electrical motor 24 to the gearbox output shaft 36 and coupling II is open. Thus, no torque can be delivered by the internal engine 18. If the electrical motor 24 is operated, a torque will be delivered to the front 14 and rear axle 16 via the cage 74 of the differential 56. Thus, a fully electric all-wheel drive (AWD) mode is achieved.

In a third drive mode shown in FIG. 5, which may be referred to as a hybrid mode of Concept 2, the coupling I connects the electrical motor 24 to the gearbox output shaft 36 and coupling II is closed. Thus, a torque can be delivered by the internal engine 18 and also by the electrical motor 24 to the gearbox output shaft 36. The torque will be delivered to the front 14 and rear axle 16 via the cage 74 of the differential 56. Depending on the operational state of the internal engine 18 and the electrical motor 24, a hybrid all-wheel drive (AWD) can be achieved by both said engines 18, 24 or an all-wheel drive (AWD) can be achieved by either of said engines 18, 24.

The following table provides an overview of the complexity of Concept 1 and Concept 2 with regard to a friction-clutch based AWD in P3 configuration as known from the prior art.

| Feature comprised | State of the art | Concept 1 | Concept 2 |
|---|---|---|---|
| Dog clutch | NO (low complexity) | YES (medium complexity) | YES (medium complexity) |
| Conventional (friction) clutch incl. additional actuator | YES (high complexity) | NO (low complexity) | NO (low complexity) |
| Transmission | 2-stage gearbox or 3-stage gear box | 1 + 1-stage gearbox + planetary gear set | 2 + 1-stage gearboxes + 2x planetary gear set + differential |

From the table it can be gained that the inventive Concepts 1 and 2 do not increase the technical complexity, but at the same time achieve improved wheel slip avoidance and torque split, respectively, better response times and increased overall system performance, as stated herein. Thus, the utility value of Concepts 1 and 2 is increased at a maintained level of system complexity compared to the prior art.

The following table provides an overview of pros and cons of Concept 1 and Concept 2 with regard to a friction-clutch based AWD in P3 configuration as known from the prior art.

| Feature comprised | State of the art | Concept 1 | Concept 2 |
|---|---|---|---|
| Response time | 100-200 ms | 30-50 ms (improved) | 30-50 ms (improved) |
| AWD Torque tolerance | 10-15% | 3-5% (improved) | 3-5% (improved) |
| AWD energy consumption | Slip energy converted to heat by friction clutch | Slip energy convertible to electric energy in one of the slip directions. Battery drainage in opposite direction possible (improved) | Slip energy convertible to electric energy in one of the slip directions. Battery drainage in opposite direction possible (improved) |
| Complexity | Reference complexity | maintained | maintained |
| stick-slip-effects | high | low (improved) | low (improved) |
| AWD Performance | Reference performance | e.g. 48 V AWD in normal mode; longitudinal torque vectoring AWD in performance mode (improved) | e.g. 50/50 AWD in normal mode; longitudinal torque vectoring AWD in performance mode (improved) |

Below, further subject-matter is disclosed that features a relation to the invention disclosed herein.

A power split all wheel drive and P3 system:

The present invention relates to an improved system for all wheel drive (AWD) of a vehicle.

Existing solutions to provide all wheel drive have been on the market for many years. However, as the technology develops there is a need to further improvements, especially with regards to fuel consumption and driving characteristics.

The present invention seeks to overcome the drawbacks of existing systems by providing an improved system as defined by the independent numbered embodiment. Preferred embodiments are defined by the dependent embodiments.

In the following, reference will be given by the appended Additional Illustrations in which:

Additional Illustrations 1-2 are schematic views of an all wheel drive system according to an embodiment;

Additional Illustration 3 is a schematic view of an all wheel drive system according to an embodiment; and Additional Illustrations 4-18 are schematic views of all wheel drive system according to further embodiments.

An AWD system is shown in Additional Illustration 1, in the below denoted "Concept 1". The system allows for four different operational modes:

Electric vehicle mode (48V FWD)

Low speed AWD (ICE RWD and 48V FWD)

Longitudinal Torque Vectoring AWD (Power split AWD)

Low drag mode (planetary gear set standing still)

These modes are further explained by the following table.

| Clutch 1 | Clutch 2 | Clutch 3 | Electric Motor | RearAxle | FrontAxle | Mode |
|---|---|---|---|---|---|---|
| To GND | Open | Closed | Vehicle speed dependent motor RPM | Disconnected | 48 V FWD | FWD EV-mode |
| To GND | Closed | Closed | Vehicle speed dependent motor RPM | ICE RWD | 48 V FWD | Hybrid mode (Low speed AWD) |
| To Gbox | Closed | Closed | Motor RPM working around 0 RPM RPM proportional to front to rear slip | PowerSplit AWD | PowerSplit AWD | Longitudinal Torque Vectoring AWD |
| To GND | Open | Open | 0 RPM | Sailing | Sailing | Low drag disconnect (planetary gear set standing still) |

In Additional Illustration 2, some further detail of the embodiment shown in Additional Illustration 1 are given. The following applies for torque vectoring (TV) mode and hybrid mode, respectfully.

TVMode:

EMToRearDiff=$Z_{EM2}/Z_{EM2}*(Z_c/Z_a+1)=50/25*(129/43+1)=8$

EMToFrontDiff==$Z_{EM2}/Z_{EM2}*(Z_c/Z_a)*((Z_{f2}/Z_{f1})=50/25*(-129/43)*(57/43)=-8$ Hybrid Mode:

EMToRearDiff=−

EMToFrontDiff==$Z_{EM2}/Z_{EM2}*(Z_c/Z_a)*(Z_{f2}/Z_{f1})=50/25*(-129/43)*(-57/43)=8$ In Additional Illustration 3 another embodiment is shown, in the below denoted "Concept 2". The possible modes available by this embodiment are:

Electric vehicle mode (48V 50/50 AWD)
Low speed AWD (ICE and EM 50/50 AWD)
Longitudinal Torque Vectoring AWD (Power split AWD)

As compared to the embodiment of Additional Illustrations 1-2, these modes are further explained by the following table.

| Clutch 1 | Clutch 2 | Clutch 3 | Electric Motor | RearAxle | FrontAxle | Mode |
|---|---|---|---|---|---|---|
| To GBOX | Open | N/A | Vehicle speed dependent motor RPM | 48 V RWD | 48 V FWD | EV-mode-50/50 AWD |
| To GBOX | Closed | N/A | Vehicle speed dependent motor RPM | ICE/EM RWD | ICE/EM FWD | Hybrid mode - 50/50 AWD |
| To Planetary GBOX | Closed | N/A | Motor RPM working around 0 RPM RPM proportional to front to rear slip | PowerSplit ICE AWD | PowerSplit ICE AWD | Longitudinal Torque Vectoring AWD |
| N/A | N/A | N/A | N/A | N/A | N/A | N/A |

The following table provides an overview of the complexity of Concept 1 and Concept 2, as well as a prior art solution (friction AWD+P3).

|  | Friction Plate AWD + P3 | Concept 1 | Concept 2 |
|---|---|---|---|
| Dog clutch | YES (red category) | YES (red category) | YES (red category) |
| Conventional clutch incl. additional actuator | YES (red category) | NO (green category) | NO (green category) |
| Transmission | 2-stage gearbox (green category) | 1 + 1-stage gearbox + planetary gearset (orange category) | 2 + 1-stage gearboxes + 2x planetary gearsets + differential (red category) |

The following table provides an overview of pros and cons of Concept 1 and Concept 2, as well as a prior art solution (conventional AWD clutch with P3).

|  | Conventional AWD Clutch with P3 | Concept 1 | Concept 2 |
| --- | --- | --- | --- |
| Response time | 100-200 ms (red category) | 30-50 ms (green category) | 30-50 ms (green category) |
| AWD Torque accuracy | 0 (red category) | + (green category) | + (green category) |
| AWD energy consumption | Slip energy converted to heat (red category) | Slip energy converted to electric energy (battery charge) (green category) | Slip energy converted to electric energy in one of the slip directions. Battery drainage in opposite direction (orange category) |
| Complexity | 0 (green category) | 0 or –? (green category) | –– (red category) |
| Torque Capacity | Independent of front to rear slip (discarding heat development) (green category) | High front to rear slip will cause loss of torque capacity. Control must inhibit too high slip (orange category) | High front to rear slip will cause loss of torque capacity. Control must inhibit too high slip (orange category) |
| NVH | 0 (red category) | +? (green category) | +? (green category) |
| AWD Performance | Conventional AWD only (red category) | 48 V AWD in normal mode longitudinal torque vectoring AWD in performance mode (orange category) | 50/50 AWD in normal mode longitudinal torque vectoring AWD in performance mode (green category) |

Additional Illustrations 4-18 show other embodiments of an all wheel drive system.

NUMBERED EMBODIMENTS

1. An all wheel drive system comprising a differential arranged between a vehicle gearbox and a front and rear axle of an associated vehicle, a first planetary gear set having a planetary gear set output being connected to one of the differential outputs, and a second planetary gear set having a planetary gear set output being connected to the other one of the differential outputs, said first and second planetary gear set sharing a common ring wheel, and an electrical motor being connected to one of the planetary gear sets by means of a coupling.

2. The all wheel drive system according to embodiment 1, wherein in a disconnected state, the coupling is connecting the electrical motor to the gearbox output shaft.

3. An all wheel drive system comprising an electrical motor being connected to a first axle of a planetary gear set arranged at an output side of a vehicle gearbox, and a coupling connecting a second axle of the planetary gear set to the gearbox output shaft while a third axle of the planetary gear set is connected to the front axle of the associated vehicle.

4. The all wheel drive system according to embodiment 3, wherein in a disconnected state, the coupling is connecting the second axle of the planetary gear set to ground.

5. The all wheel drive system according to any one of embodiments 1-4, wherein said coupling being a non-friction clutch.

6. The all wheel drive system according to embodiment 5, wherein the non-friction clutch is a dog clutch or a coupling sleeve.

7. The all wheel drive system according to embodiment 3, wherein the first, second, and third axles of the planetary gear set is either one of a sun gear, a planet carrier, and a ring wheel, in any configuration.

An all wheel drive system is provided.

The invention claimed is:

1. All-wheel drive system (10) for a vehicle (12), comprising:
an electrical motor (24) being connected to a first axle (26) of a planetary gear set (28) arranged at an output side (30) of a vehicle gearbox (32), and
a second axle (34) of the planetary gear set (28) being connected or connectable to the gearbox output shaft (36) or to ground (G) by a coupling (I),
while a third axle (38) of the planetary gear set (28) is connected or connectable to the front axle (14) of the associated vehicle (12), and wherein the coupling (I) is switchable and in a disconnected state, the coupling (I) is disconnected from the gearbox output shaft (36) and connecting the second axle (34) of the planetary gear set (28) to ground (G).

2. All-wheel drive system (10) according to claim 1 wherein the first (26), second (34), and third axles (34) of the planetary gear set (28) are comprised by either one of a sun gear wheel (40), a planet carrier (42), and a ring gear wheel (44).

3. All-wheel drive system (10) according to claim 1, wherein said coupling (I) is a non-friction clutch.

4. All-wheel drive system (10) for a vehicle (12), comprising:
a differential (56) arranged between a vehicle gearbox (32) and a front (14) and rear axle (16) of an associated vehicle (12),
a first planetary gear set (28) having a planetary gear set output (58) being connected to one of the differential outputs (60), and
a second planetary gear set (62) having a planetary gear set output (64) being connected to the other one of the differential outputs (68), wherein
said first (28) and second planetary gear set (62) are sharing a common ring wheel (44), and an electrical motor (24) is selectively connectable to one of the planetary gear sets (28) or to a gearbox output shaft (36) by means of a coupling (I).

5. All-wheel drive system (10) according to claim 4, wherein in a disconnected state, the coupling (I) is connecting the electrical motor (24) to the gearbox output shaft (36).

6. All-wheel drive system (10) according to claim 4, wherein said coupling (I) is a non-friction clutch.

7. All-wheel drive system (10) according to claim 6, wherein the non-friction clutch is a dog clutch (48) or a coupling sleeve (76).

8. Vehicle (12), comprising an all-wheel drive system (10) comprising:
an electrical motor (24) being connected to a first axle (26) of a planetary gear set (28) arranged at an output side (30) of a vehicle gearbox (32), and
a second axle (34) of the planetary gear set (28) being connected or connectable to the gearbox output shaft (36) or to ground (G) by a coupling (I),
while a third axle (38) of the planetary gear set (28) is connected or connectable to the front axle (14) of the associated vehicle (12)), and wherein the coupling (I) is switchable and in a disconnected state, the coupling (I) is disconnected from the gearbox output shaft (36) and connecting the second axle (34) of the planetary gear set (28) to ground (G).

9. Vehicle (12), comprising an all-wheel drive system (10) comprising:
a differential (56) arranged between a vehicle gearbox (32) and a front (14) and rear axle (16) of an associated vehicle (12),
a first planetary gear set (28) having a planetary gear set output (58) being connected to one of the differential outputs (60), and a second planetary gear set (62) having a planetary gear set output (64) being connected to the other one of the differential outputs (68), wherein said first (28) and second planetary gear set (62) are sharing a common ring wheel (44), and an electrical motor (24) is selectively connectable to one of the planetary gear sets (28) or to a gearbox output shaft (36) by means of a coupling (I).

\* \* \* \* \*